(12) United States Patent
Larsson et al.

(10) Patent No.: US 10,223,885 B2
(45) Date of Patent: Mar. 5, 2019

(54) CAMERA ARRANGEMENT WITH ILLUMINATOR

(71) Applicant: Axis AB, Lund (SE)

(72) Inventors: Stefan Larsson, Lund (SE); Andreas Hertzman, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/834,716

(22) Filed: Dec. 7, 2017

(65) Prior Publication Data

US 2018/0165932 A1 Jun. 14, 2018

(30) Foreign Application Priority Data

Dec. 9, 2016 (EP) ..................................... 16203192

(51) Int. Cl.
| | |
|---|---|
| *G08B 13/196* | (2006.01) |
| *H04N 5/225* | (2006.01) |
| *H04N 5/33* | (2006.01) |
| *G03B 17/02* | (2006.01) |
| *G03B 17/12* | (2006.01) |
| *G03B 17/56* | (2006.01) |

(52) U.S. Cl.
CPC ....... *G08B 13/19632* (2013.01); *G03B 17/02* (2013.01); *G03B 17/12* (2013.01); *G03B 17/561* (2013.01); *G08B 13/19619* (2013.01); *H04N 5/2251* (2013.01); *H04N 5/2252* (2013.01); *H04N 5/2253* (2013.01); *H04N 5/2254* (2013.01); *H04N 5/2256* (2013.01); *H04N 5/332* (2013.01)

(58) Field of Classification Search
CPC ...... G03B 17/02; G03B 17/12; G03B 17/561; G08B 13/19619; G08B 13/19632; H04N 5/2251; H04N 5/2252; H04N 5/2253; H04N 5/2254; H04N 5/2256; H04N 5/332

See application file for complete search history.

(56) References Cited

U.S. PATENT DOCUMENTS

| | | | | |
|---|---|---|---|---|
| 3,739,703 | A * | 6/1973 | Behles .................. | G03B 15/00 348/151 |
| 4,984,089 | A * | 1/1991 | Stiepel .................. | G03B 17/08 165/48.1 |
| 6,707,619 | B1 * | 3/2004 | Okuno ............. | G08B 13/19632 348/E7.085 |
| 6,912,007 | B2 * | 6/2005 | Gin .................. | G08B 13/19619 348/143 |
| 9,172,917 | B1 * | 10/2015 | Fu ........................... | H04N 7/18 |
| 2002/0015296 | A1 * | 2/2002 | Howell .................. | E04B 9/006 362/11 |

(Continued)

FOREIGN PATENT DOCUMENTS

| | | |
|---|---|---|
| CN | 203 517 546 U | 4/2014 |
| CN | 104 595 752 A | 5/2015 |

(Continued)

OTHER PUBLICATIONS

EP 16203192.6 European Search Report (dated Jun. 16, 2017).

*Primary Examiner* — Peter D Le
(74) *Attorney, Agent, or Firm* — Volpe and Koenig, P.C.

(57) ABSTRACT

A camera arrangement comprising a camera head, an illumination arrangement, and a dome. The camera head is arranged inside the dome, and the illumination arrangement is arranged on an outside of the dome.

9 Claims, 3 Drawing Sheets

(56) References Cited

U.S. PATENT DOCUMENTS

| | | | | |
|---|---|---|---|---|
| 2003/0184740 | A1* | 10/2003 | Paradis | G01N 21/8806 356/237.1 |
| 2004/0183907 | A1* | 9/2004 | Hovanky | G02B 13/06 348/151 |
| 2005/0024523 | A1* | 2/2005 | Vernon | H04N 5/2256 348/370 |
| 2006/0017842 | A1* | 1/2006 | Jun | G03B 37/02 348/373 |
| 2007/0201862 | A1* | 8/2007 | Van Schaik | G08B 13/19619 396/427 |
| 2007/0292121 | A1* | 12/2007 | Sato | G08B 13/19619 396/144 |
| 2008/0158661 | A1* | 7/2008 | Tanaka | G02B 7/102 359/350 |
| 2009/0021634 | A1* | 1/2009 | Chang | H04N 5/2252 348/372 |
| 2009/0198099 | A1* | 8/2009 | Myers | A61B 1/00158 600/109 |
| 2011/0054327 | A1* | 3/2011 | Kim | A61B 5/0077 600/473 |
| 2011/0221908 | A1* | 9/2011 | Hoelter | B29C 43/36 348/164 |
| 2012/0092504 | A1 | 4/2012 | Murphy et al. | |
| 2012/0170119 | A1* | 7/2012 | Chu | G03B 17/55 359/512 |
| 2012/0263447 | A1* | 10/2012 | Fransson | G03B 15/03 396/164 |
| 2013/0100292 | A1 | 4/2013 | Mojaver | |
| 2013/0155233 | A1* | 6/2013 | Dahlqvist | H04N 5/225 348/143 |
| 2013/0169805 | A1* | 7/2013 | Park | G08B 13/19619 348/143 |
| 2014/0002676 | A1 | 1/2014 | Ning | |
| 2014/0044427 | A1* | 2/2014 | Huang | G03B 15/03 396/176 |
| 2014/0301727 | A1 | 10/2014 | Resh | |
| 2014/0339442 | A1* | 11/2014 | Huang | G03B 15/05 250/495.1 |
| 2015/0015703 | A1* | 1/2015 | LaFemina | F21V 33/0076 348/143 |
| 2015/0358538 | A1 | 12/2015 | Donaldson | |
| 2016/0094764 | A1* | 3/2016 | Martin | G01P 15/00 348/208.2 |
| 2017/0261836 | A1* | 9/2017 | Wada | H04N 5/225 |
| 2017/0331987 | A1 | 11/2017 | Kimura | |
| 2018/0110406 | A1* | 4/2018 | Sarnaik | A61B 1/00087 |
| 2018/0187828 | A1 | 7/2018 | Law et al. | |

FOREIGN PATENT DOCUMENTS

| | | |
|---|---|---|
| WO | 2004/095386 A1 | 11/2004 |
| WO | 2008/017857 A1 | 2/2008 |

\* cited by examiner

CAMERA ARRANGEMENT WITH ILLUMINATOR

FIELD OF INVENTION

The present teachings relate to monitoring cameras having integrated illumination arrangements, and in particular monitoring cameras having IR illuminators.

BACKGROUND

Monitoring cameras are used in many different applications, both indoors and outdoors, for monitoring a variety of environments. Digital monitoring cameras use image sensors that are sensitive to a wider spectral range of light than the human eye. Digital image sensors, such as CCD sensors and CMOS sensors, are sensitive not only to visual light, but also to part of the IR spectral range. In a well-lit scene, the IR component is generally a disadvantage, as it distorts the colours of captured images compared to what the human eye can see. Therefore, an IR cut filter is normally placed in front of the image sensor in a day-mode of the camera, such that only visual light reaches the image sensor. When there is little visual light in the scene, such as at night, the sensitivity to IR light may be used to advantage. In a night-mode of the camera, the IR cut filter is removed, such that also IR light may reach the image sensor. In the night-mode, any colour information available is disregarded, and only light intensity is used, such that a black and white image is produced.

IR light is in most cases available to some extent in the scene, such that images may be captured also at night. Still, in many cases there is a need to add light. IR illuminators may therefore be arranged in the scene. These may be separate units, arranged some distance from the camera, but may be controlled by or in conjunction with the camera, such that the IR illuminator is turned on when the camera determines that there is too little light in the scene. Some IR illuminators are mounted on the outside of the camera, such as a half-circular illuminator marketed by Axis Communications AB under the name AXIS T90C10 Fixed Dome IR-LED.

Cameras may also be equipped with integrated IR illuminators, arranged inside a dome of the camera. A problem with such an arrangement is that there is a risk that light from the illuminator is reflected on the inside of the dome and enters the camera, thereby causing complete or partial saturation of the image sensor. To prevent this risk, a gasket is placed around the camera for sealing against the dome. If the dome is not mounted carefully, stray light from the illuminator may still be reflected and reach the image sensor. This becomes even more problematic in camera arrangements having more than one camera head, as each camera head has to be sealed off properly.

Some cameras do not have a dome, such that an IR illuminator may be integrated in the camera without the risk of internal reflections. However, this solution comes at the cost of a less protected camera, making the camera unsuited for applications where there is a risk of, e.g., vandalism.

So far, IR illuminators have been discussed, but it should be noted that there are also illuminators emitting light in the visible spectral range. The problems described above in connection with IR illuminators apply also to visible light illuminators. The choice of which spectral range to illuminate the scene with depends on the specific monitoring situation. An illuminator providing visible light may have a great deterring effect. For instance, such an illuminator may be activated based on a motion detection event, such that when a person enters the monitored scene, light is turned on, making the person realise he or she has been detected. Still, there are situations when visible illumination would be annoying, e.g., to neighbours. There are also situations where a more discrete or covert surveillance is desired. In the two latter examples, an IR illuminator may be a better choice, since such illumination will be less noticeable or even invisible. IR illuminators may emit different wavelengths. Some IR illuminators emit wavelengths of, e.g., 730 nm or 850 nm, and these wavelengths generally produce a faint glow in the vicinity of the illuminator. Other IR illuminators operate at 940 nm, which is completely outside the visible spectral range and may be used for covert surveillance.

Regardless of the spectral range emitted by the illuminator, there is still a need for improvements in the arrangement of illuminators in connection with cameras.

SUMMARY

It is an object of the disclosure to provide a camera arrangement comprising a dome and an illumination arrangement, which reduces the risk of unwanted reflections into the image sensors.

Another object is to provide a camera arrangement in which mounting is simplified, while still ensuring proper isolation of the illumination arrangement.

These and other objects are achieved, in full or at least in part, by a camera arrangement comprising a camera head, an illumination arrangement and a dome, wherein the camera head is arranged inside the dome, and the illumination arrangement is arranged on an outside of the dome. With such a camera arrangement, it is possible to provide light for monitoring a scene which otherwise contains too little light, while avoiding the risk of internal reflections in the dome. The dome has a toroidal shape with a rotational symmetry along a rotational angle ($\alpha$) around a first axis of symmetry (S1), at least an outer segment of the dome is transparent, the outer segment has a shape in section which is defined by a second axis of symmetry (S2) arranged at a first radius (R) from the first axis of symmetry (S1) and orthogonal to the first axis (S1), the outer segment having a radius of curvature (r) over an angle ($\beta$) around the second axis of symmetry (S2), the dome further comprises a central segment connecting the outer segment with the first axis of symmetry, and the illumination arrangement is arranged at the central segment. A dome of this shape makes it possible to tilt each camera head to a desired angle while still maintaining essentially the same distance from an inside of the outer segment of the dome. Thereby, optical aberrations caused by the dome may be avoided. Further, the central segment provides a suitable location for the illumination arrangement, ensuring that the illumination arrangement does not block the field of view of any of the camera heads. It may be noted that the description of the central segment as connecting the outer segment with the first axis of symmetry, should not be taken literally, as the first axis of symmetry is a geometrical construct, and not necessarily a physical one.

In an embodiment, the camera arrangement comprises a plurality of camera heads, the camera heads being arranged inside the dome. In camera arrangements with a plurality of cameras it may be easy to place the camera heads essentially in a circle, and to arrange the illumination arrangement at a centre of the circle, thereby easily avoiding blocking the field of view of the camera heads.

In one embodiment, the angle over which the outer segment is curved is less than or equal to 90°, and a transition from the outer segment (104) to the central segment is rounded. This affords a less complex dome shape, which still allows a wide range of tilt angles for the camera heads without introducing annoying lines in captured images.

The illumination arrangement may comprise a circumferential wall arranged to prevent light from the illumination arrangement from entering the dome. In this manner, it may be ensured that light emitted by the illumination arrangement will not fall directly into the dome, where it may cause internal reflections. Naturally, light emitted by the illumination arrangement is, eventually, intended to enter the dome to be captured by an image sensor of the camera, but not until it has been reflected in the scene that the camera is monitoring.

In an embodiment, the illumination arrangement comprises an IR illuminator. IR illuminators have the advantage of being able to provide discrete illumination of a scene, such that disturbing light may be avoided or covert monitoring may be achieved.

The IR illuminator may comprise a plurality of IR LEDs. IR LEDs are generally an efficient source of IR light.

The IR illuminator may be arranged to emit IR light in a spectral range of 730-1000 nm. Within this range, an image sensor of the camera may make good use of the added light. Further, within a subrange around 940 nm, the emitted IR light is completely invisible to the human eye.

According to an embodiment, the illumination arrangement comprises wiring passing through the central segment to an electronics unit of the camera arrangement. This enables an efficient routing of wiring to the illumination arrangement for powering and control.

The camera arrangement may further comprise a camera base for mounting the camera to a surface, the camera base comprising a central receiving portion, wherein the illumination arrangement comprises an attachment device for attaching the dome to the central receiving portion. The surface to which the camera is mounted may, e.g., be a wall, a ceiling, a lamp post, or a mounting arm. By including an attachment device in the illumination arrangement, an attachment of the dome to the camera base may be achieved which enables a compact design of the camera. It should be noted that the camera arrangement may be mounted to a surface either directly by the camera base, or via a mounting bracket which is mounted to the surface and to which the camera base is mounted.

A further scope of applicability of the present disclosure will become apparent from the detailed description given below. However, it should be understood that the detailed description and specific examples, while indicating preferred embodiments, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where.

DETAILED DESCRIPTION

Figure 1:
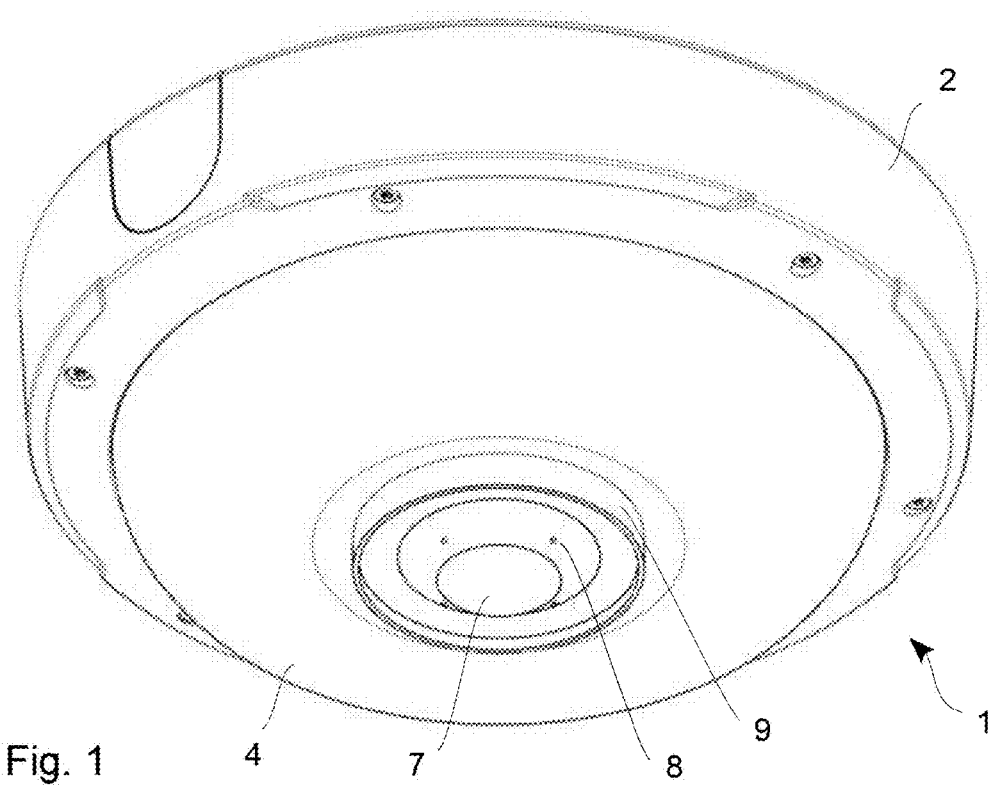
FIG. 1 is a perspective view of an embodiment of a camera arrangement.
Figure 2:
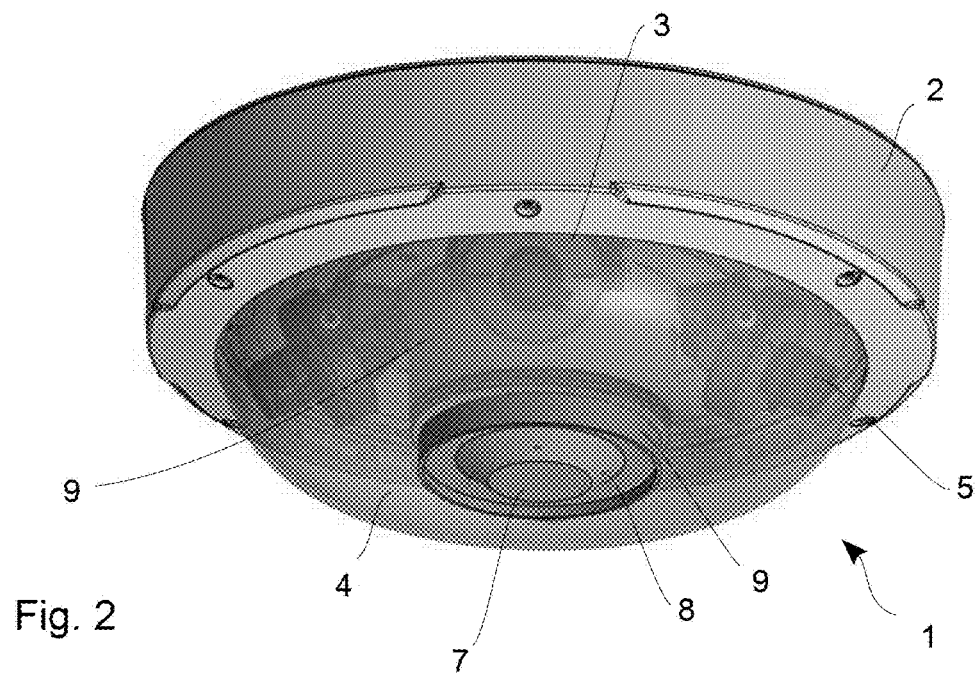
FIG. 2 is a perspective view of the camera arrangement of FIG. 1.

In FIGS. 1 and 2, a camera arrangement 1 is shown, which has a base 2, four camera heads 3, and a dome 4. For the sake of clarity of other details, the camera heads are not visible in FIG. 1, but three of them may be seen in FIG. 2, the fourth one being obscured at the back in this view. The camera heads 3 are arranged inside the dome 4. The camera heads 3 may be mounted on holders 5 held by magnetic force on a mounting rail (not shown) as disclosed in applicant's EP-2 887 328, which is incorporated herein by reference.

Figure 3:
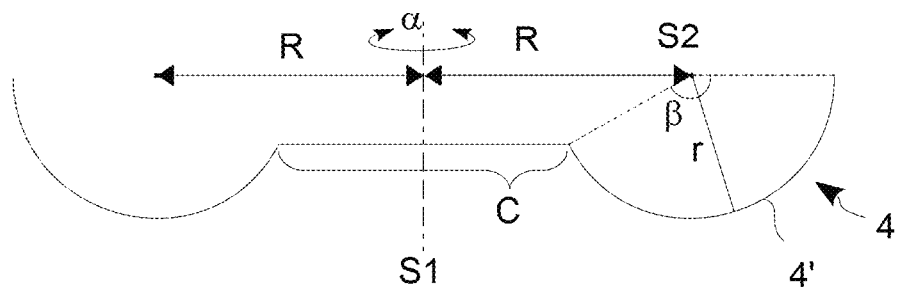
FIG. 3 is a sectional view of the dome of the camera of FIG. 1.
Figure 4:
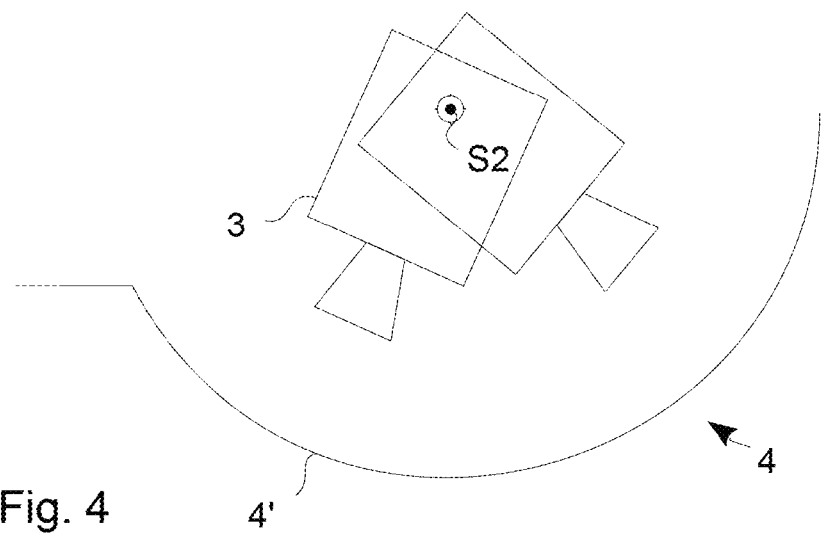
FIG. 4 is a sectional view of a detail in FIG. 3.
Figure 6:
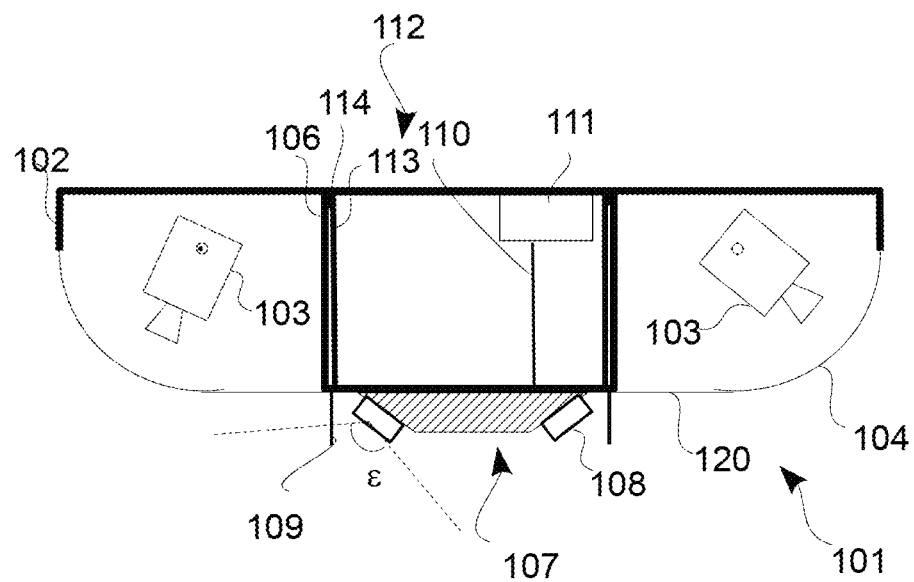
FIG. 6 is a sectional view of another embodiment of a camera arrangement.

In FIG. 1, the dome 4 has a toroidal shape, which may be said to be a halved "donut" or a halved "swim ring", and which is shown separately in FIG. 3. Such a dome is disclosed in applicant's as yet unpublished EP application No. 15194656.3, which is also incorporated herein by reference. The shape of the dome may be described as being toroidal with a rotational symmetry along a rotational angle α around a first axis of symmetry S1. Further, the dome has an outer segment 4' which has a shape in section which is defined by a second axis of symmetry S2 arranged at a first radius R from the first axis of symmetry S1 and orthogonal to the first axis S1. The outer segment 4' has a radius of curvature r over an angle β around the second axis of symmetry S2. The dome 4 further comprises a central segment C connecting the outer segment 4' with the first axis of symmetry S1. The dome 4 is made of a transparent material, such as polycarbonate. The shape of the dome 4 makes it possible to tilt the camera heads 3 at various angles, as illustrated in FIG. 3, such that they may be pointed anywhere between essentially horizontal and essentially vertical, without the distance to the inside of the dome 4 changing. In this manner, it is possible to avoid optical aberrations, image distortion and disturbing lines in the images. For instance, if a prior art dome of a flat bowl shape, i.e. with a similarly curved outer circumference, but with an otherwise flat surface, and a sharp "corner" between the curved part and the flat part, were used, there would be a line in the images if a camera head were pointed towards the junction between the curved circumference and the flat "bottom" of the bowl-shaped dome. FIG. 6 shows an example of a camera arrangement 101 with another flat bowl-shaped dome 104, which lacks the sharp "corner" at the junction between the curved circumference and the flat "bottom", and which will be discussed in more detail further down.

Returning to FIG. 1, at the centre of the dome 4, there is a central cylinder 6, on which an illumination arrangement 7 is arranged. The illumination arrangement 7 has a number of IR illuminators, here in the form of IR LEDs 8. Further, the illumination arrangement 7 has a circumferential wall 9, which blocks the beam path from the IR LEDs 8 into the dome 4. Thereby, even if the IR LEDs have a wide emission angle ε, it may be ensured that light is not emitted directly into the dome, where it could be reflected on the inside of the dome and completely or partly blind the image sensor. In the embodiment shown in FIG. 1, the illumination arrangement has five IR LEDs 8, each emitting light in an angle ε of approximately 90°. The IR LEDs 8 may thereby provide light all around the camera arrangement 1. The IR LEDs are arranged on a generally conical surface, such that they emit light mainly away from the camera heads 5 inside the dome 4.

Wiring 10 to the IR LEDs 8 extends from an electronics unit 11 in the camera base 2 through the central cylinder 6. The wiring 10 is thereby well protected and needs to take only a short route from the electronics unit 11 to the illumination arrangement 7. The wiring 10 may be used for powering the illumination arrangement 7 and also for controlling it. For instance, the camera arrangement 1 may control the illumination arrangement 7 to be turned on when it is determined that there is too little light in the scene.

Figure 5:
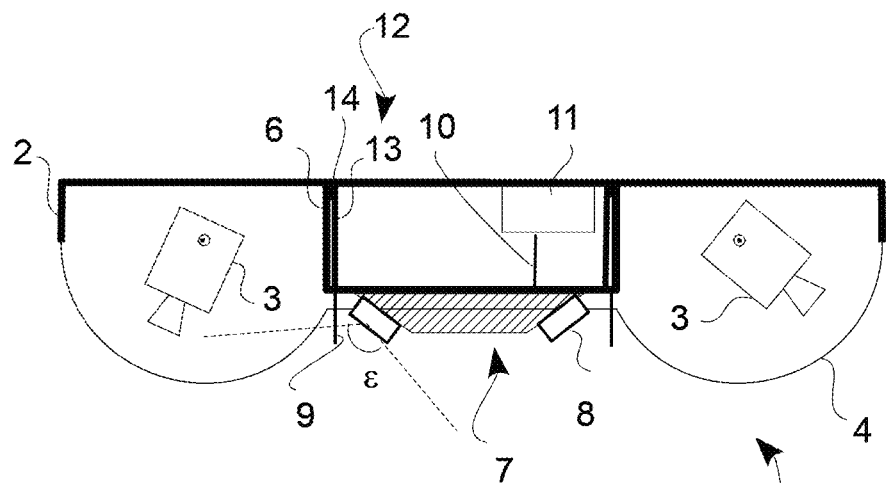
FIG. 5 is a sectional view of the camera arrangement of FIG. 1.

The illumination arrangement 7 further comprises an attachment device 12, as may be seen in FIG. 5. In the embodiment shown, the attachment device 12 is in the form of an attachment sleeve 13 with a bayonet mount 14 at an end distal from the IR LEDs 8. By means of this attachment device 12, the dome 4 may be securely attached to the camera base 2. When mounting the camera arrangement 1, the dome 4 is placed on the base 2, and the attachment sleeve 13 is inserted in the central cylinder of the dome 4. The illumination arrangement 7 is rotated until the bayonet mount 14 engages a corresponding engagement portion of the camera base (not shown), thereby locking the illumination arrangement 7 and dome 4 in place on the camera base 2. In this manner, it is possible to forego the cover ring that is usually arranged around the dome for connecting the dome to the camera base using a number of screws. Such a cover ring is actually shown in FIGS. 1 and 2, but could accordingly be dispensed with. The camera arrangement 1 may thereby be made more compact, with a smaller outer diameter. The attachment device 12 integrated in the illumination arrangement also reduces the number of separate parts needed for mounting the dome on the camera base, and the risk that an installer drops one or more screws for fastening the dome is eliminated.

Typical wavelength intervals for the IR illuminators reside around the range between 730 nm and about 1000 nm, for example around 730 nm, around 850 nm and around 940 nm. Of these, the 940 nm would be fully outside of the visible spectral range, while the 730 nm and the 850 nm would give a faint glow in the area of the illumination source.

It will be appreciated that a person skilled in the art can modify the above described embodiments in many ways and still use the advantages of the disclosure as shown in the embodiments above. As an example, in the embodiment described above, the illumination arrangement has a number of IR LEDs. It would be possible to have, instead, an illumination arrangement with a visible light illuminator, e.g., using white LEDs or other light sources. It would also be possible to combine IR and visible light illuminators. A visible light illuminator may, apart from providing light necessary for capturing images, draw attention to the camera arrangement. This may for instance be utilised for making a person turn towards the camera arrangement, such that good images of the persons face may be obtained.

In the embodiment shown in the drawings, the camera arrangement has four camera heads. Still, it is entirely possible to utilise the disclosed teachings also for camera arrangements with more or fewer camera heads. It is particularly advantageous to place the illumination arrangement on the outside of the dome of camera arrangements having a number of camera heads arranged around an empty centre, as the illumination arrangement may then easily be placed at the centre of the dome without blocking the view of the camera heads. Reference may here be made to FIG. 6, in which an embodiment of a camera arrangement 101 is shown. In FIG. 6, the same reference numerals are used as in the previous figures, but with the addition of 100. The camera arrangement 101 has a camera base 102, four camera heads 103, and a flat bowl-shaped dome 104. In this embodiment, the allowable tilt angle range for the camera heads 103 may possibly be smaller than for the camera heads 3 in the embodiment shown in FIG. 1, as the transition where the outer segment 104' meets the flat part 120 of the dome 104 may introduce slight distortions in captured images if the camera heads 103 are pointed straight downwards. Still, the smooth transition from the rounded outer segment 104' to the flat portion 120 would not introduce an annoying line in the images, as would the prior art flat bowl-shaped dome discussed above, in which there is a sharp "corner" between the rounded outer segment and the flat "bottom". In the same manner as discussed in connection with FIG. 1, an illumination arrangement 107 is arranged at a centre of the dome 104. The camera arrangement 101 differs from the one shown in FIG. 1 only with respect to the shape of the dome, and therefore the description of the illumination arrangement will not be repeated here.

Other dome shapes are also feasible. For instance, if the camera heads inside the dome are fixed in position and tilt angle, the dome could be provided with a flat portion in front of each camera head. Further, if the camera heads are fixed in position, but pannable and tiltable, a "bubble" could be formed in the dome in front of each camera head.

In a camera arrangement with only one camera head, it may be necessary to form a special portion of the dome for attaching the illumination arrangement, where it is out of the way for the camera head. This may make the camera arrangement larger than had been the case without an externally dome mounted illumination arrangement, but the advantage of avoiding internal reflections in the dome may outweigh this disadvantage. The addition to the size may in some cases not be larger than what would be the case with a separate, externally mounted illumination arrangement.

In FIG. 1, the illumination arrangement 7 has five IR LEDs 8, each emitting light in an angle of approximately 90°. Other numbers of IR LEDs could be used, with other emission angles, for obtaining the desired illumination. For instance, three IR LEDs with an emission angle of 140° each could be used. In some applications, it may be desired to illuminate only part of the space outside the camera arrangement, such that it is not necessary to cover a full 360° around the camera arrangement. If, for example, the camera arrangement is mounted in a ceiling, close to a wall, it may not be necessary or desired to illuminate the wall next to the camera arrangement, but only the part of the scene that is in front of and below the camera arrangement, i.e. the ground and objects on the ground. In some embodiments, the camera arrangement may be provided with a an illumination arrangement that normally provides 360° illumination, but in which one or more of the illuminators may be turned off, such that, e.g., a nearby wall is not illuminated. Alternatively or additionally, the illumination arrangement may be provided with a shielding portion, which may form an extension of a section of the circumferential wall, and which may prevent illumination of, e.g., a nearby wall.

The illumination arrangement on the outside of the dome of the camera arrangement may be combined with other devices, such as other sensors. It would also be possible to use the same concept for arranging only other devices on the camera arrangement, even if no illumination arrangement is included. For example, another sensor, such as a PIR sensor or another camera head may be arranged on the outside of the dome, in the same manner as described above for the illumination arrangement. The camera head may be of the same type as the ones inside the dome, but it may in many cases be advantageous to have another type of camera on the outside of the dome. For instance, a fisheye camera may be arranged on the outside. It would also be possible to arrange a microphone and/or a speaker on the outside of the dome. Camera arrangements are known from which deterrents, such as tear gas, may be dispensed if an intruder comes too close to the camera arrangement. Such a deterrent dispenser, e.g., a tear gas canister, a colour spray canister, or a DNA spray canister, could be arranged on the outside of the dome in essentially the same manner as the illumination arrangement described above. The illuminators or other devices may be removably and exchangably arranged, such that the camera arrangement may be sold without the illumination arrangement, and then be retrofitted with the illumination arrangement or other device.

The attachment device of the illumination arrangement could also be used without illuminators or any other devices arranged. In such case, the illumination arrangement could be replaced with just a flat lid.

Thus, the teachings should not be limited to the shown embodiments but should only be defined by the appended claims.

What is claimed is:

1. A camera arrangement comprising:
   a camera head;
   an illumination arrangement; and
   a dome, wherein:
   the camera head is arranged inside the dome;
   the illumination arrangement is arranged on an outside of the dome;
   the dome has a toroidal shape with a rotational symmetry along a rotational angle around a first axis of symmetry;
   at least an outer segment of the dome is transparent;
   the outer segment has a shape in section which is defined by a second axis of symmetry arranged at a first radius from the first axis of symmetry and orthogonal to the first axis, the outer segment having a radius of curvature over an angle around the second axis of symmetry;
   the dome further comprises a central segment connecting the outer segment with the first axis of symmetry; and
   the illumination arrangement is arranged at the central segment.

2. The camera arrangement according to claim 1, comprising a plurality of camera heads, the camera heads being arranged inside the dome.

3. The camera arrangement according to claim 1, wherein the angle over which the outer segment is curved is less than or equal to 90°, and wherein a transition from the outer segment to the central segment is rounded.

4. The camera arrangement according to claim 1, wherein the illumination arrangement comprises a circumferential wall arranged to prevent light from the illumination arrangement from entering the dome.

5. The camera arrangement according to claim 1, wherein the illumination arrangement comprises an IR illuminator.

6. The camera arrangement according to claim 5, wherein the IR illuminator is arranged to emit IR light in a spectral range of 730-1000 nm.

7. The camera arrangement according to claim 5, wherein the IR illuminator comprises a plurality of IR LEDs.

8. The camera arrangement according to claim 7, wherein the IR illuminator is arranged to emit IR light in a spectral range of 730-1000 nm.

9. The camera arrangement according to claim 1, wherein the illumination arrangement comprises wiring passing through the central segment to an electronics unit of the camera arrangement.

* * * * *